Dec. 30, 1941.   G. A. MOORE   2,267,798
MEANS AND METHOD FOR FORMING JUNCTURES
Filed Aug. 20, 1938
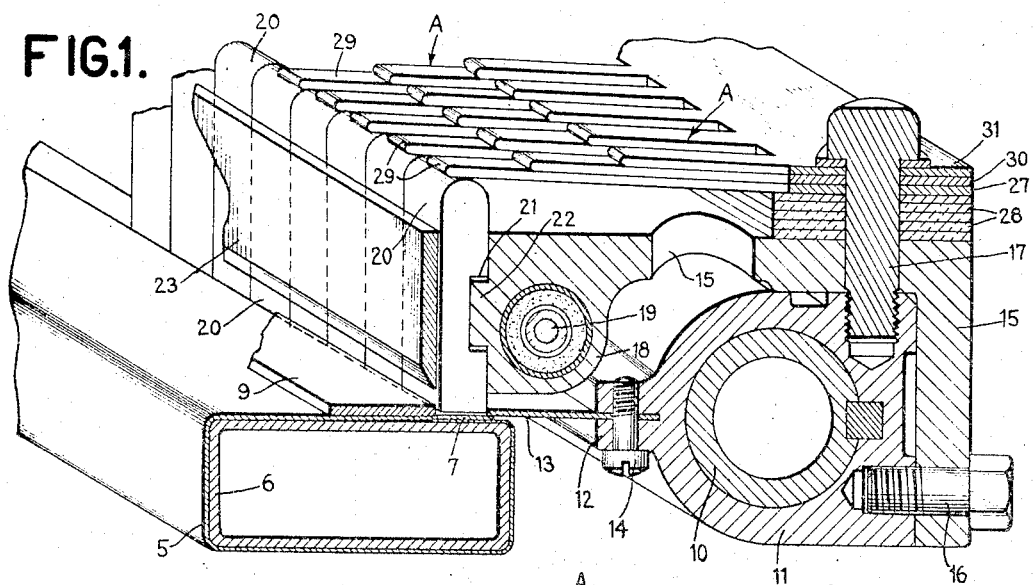
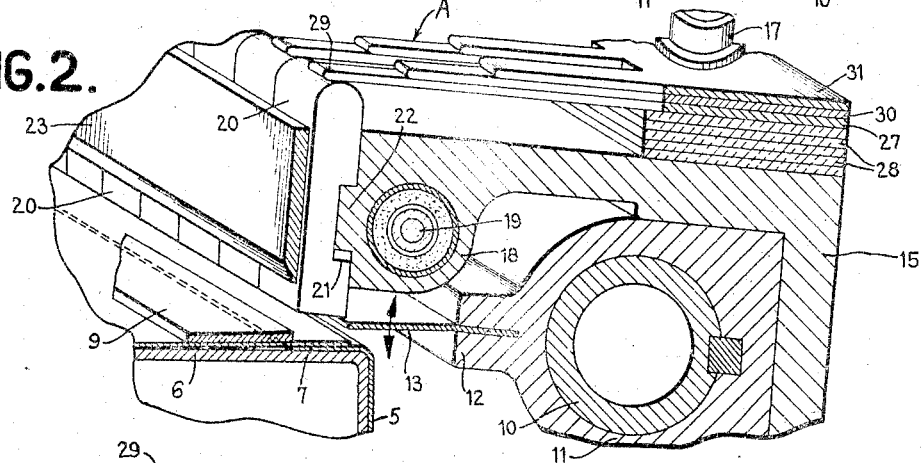
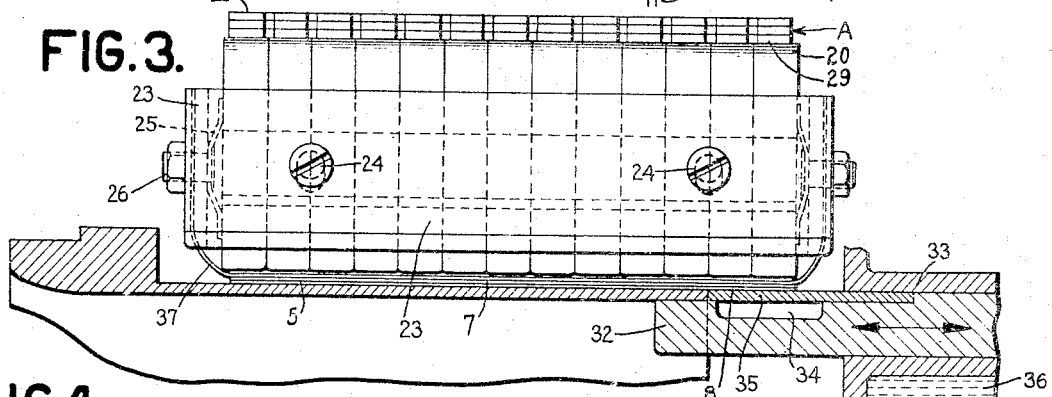
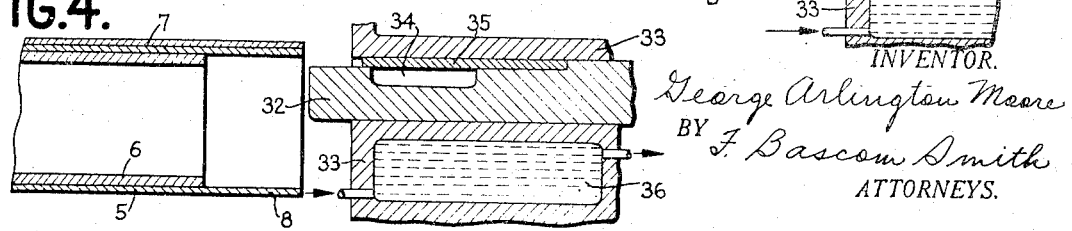
INVENTOR.
George Arlington Moore
BY F. Bascom Smith
ATTORNEYS.

Patented Dec. 30, 1941

2,267,798

UNITED STATES PATENT OFFICE 2,267,798

MEANS AND METHOD FOR FORMING JUNCTURES

George Arlington Moore, Louisville, Ky., assignor to Humoco Corporation, Louisville, Ky., a corporation of Delaware Application August 20, 1938, Serial No. 225,891

19 Claims. (Cl. 93—36)

This invention relates to containers and more particularly to methods and means for heat sealing junctures or seams to form containers or other articles.

Heretofore in joining adjacent surfaces of superposed flexible materials, such as paper, metallic foil and the like, by the application of heat and pressure to activate a thin, dry film of thermoplastic adhesive interposed between said surfaces, the universal practice has been to press the overlapping or superposed portions of said material between two rigid members having flat operating faces, one or both of said members being heated. This method has not resulted in the consistent provision of seams or junctures which are properly and satisfactorily sealed throughout each increment of the length thereof because it has been found to be substantially impossible to maintain the operating faces of the pressure members in parallel alignment and because the thickness of the materials being acted upon is generally somewhat irregular, thereby preventing adequate application of heat and pressure to all portions of the seam throughout its length. Very slight misalignment or irregularities are quite material since the thickness of the adhesive film is generally only about .0005 inch. Furthermore, intimate contact must be had between the sealing iron and the material to insure proper and adequate transfer of heat and hence, proper activation of the adhesive.

It is accordingly one of the objects of the present invention to provide novel means whereby impervious seams or junctures, of the above character, may be readily formed by the application of heat and pressure.

Another object of this invention is to provide novel apparatus whereby misalignment of the operating faces of pressure applying parts and irregularities in the thickness of the materials are compensated for during the application of pressure by said parts to superposed portions of said materials.

Still another object is to provide a novel method and means for adhesively joining together engaging surfaces of materials such as paper, metal foil and the like.

A further object is to provide novel mechanism for making tubular container bodies or the like which is simply constructed and simple and efficient in operation.

The above and further objects and novel features of the invention will more fully appear from the following detailed description when the same is read in connection with accompanying drawing. It is to be expressly understood however, that the drawing is for the purpose of illustration only and is not intended to define the limits of the invention, reference for this latter purpose being had primarily to the appended claims.

In the drawing, wherein like reference characters refer to like parts through the several views, Fig. 1 is an isometric view, partly in section and with parts broken away, showing one form of the novel apparatus comprehended by the present invention;

Fig. 2 is a similar view showing a portion of said apparatus in a different operating position;

Fig. 3 is a front elevation, partly in section and with parts broken away, of said apparatus with some modifications; and, Fig. 4 is a similar detail view showing a part of the apparatus of Fig. 4 in a different operating position.

One embodiment of the invention is shown in the accompanying drawing, by way of example, in the form of apparatus adapted for heat sealing the overlapping ends of blanks of sheet material, such as paper, laminated paper and metallic foil or the like, folded about a mandrel or arbor to form tubular container bodies. The mechanism shown constitutes a part of a larger machine which has been constructed and will be referred to in the following description, said machine being adapted for making, filling, and closing containers of the character above referred to in a novel manner to render the same impervious to both gases and liquids. The function of the particular position of said machine which is included in the present invention is to heat-seal the longitudinal body seam of said container in an impervious manner.

In practicing the novel method of the present invention a blank 5 of suitable sheet material is folded around a hollow arbor 6 with opposite ends of the blank overlapping, as at 7, and with an edge portion thereof projecting beyond one end of the arbor, as at 8 (Fig. 4). Preferably arbor 6 and a plurality of others like it may be mounted on and moved with a turret of the character illustrated in Bronander Patent No. 1,926,192 so that, by intermittent motion of the turret, each arbor, after being wrapped with a blank 5, is moved to the illustrated position adjacent the sealing mechanism to be next described. The overlapping ends of the blank are preferably held in position by a plate 9 that may also be carried by the turret which constitutes no part of the present invention. Arbor 6 is preferably hollow and open at both ends, the same having comparatively thin, tempered steel walls except at the left end thereof, as viewed in Fig. 3, at which end the same is secured to the turret or other supporting means.

When blank 5 has been wrapped around arbor 6 and the latter is moved into the position illustrated in Fig. 2, the overlapping seam portions at 7 are acted upon by a novel heat and pressure applying assembly to activate a thin, dry film of lacquer or other suitable thermoplastic adhesive previously applied to one or both of the engaging surfaces of said overlapping portions and thereby join said surfaces to form an impervious seam. Said novel assembly in the form shown is supported on a hollow rotatable shaft 10 which may be reciprocated through a small angular distance by suitable means (not shown). A sleeve 11 is keyed on said shaft for movement therewith, a portion of said sleeve adjacent arbor 6 being provided with a radially extending bifurcated portion 12 which supports a tempered steel plate 13 that is of a resilient nature and is held in place by one or more screws 14. The outer edge of plate 13 is effective, when shaft 10 moves in a counterclockwise direction, as viewed in Figs. 1 and 2, to engage the margin of one end of blank 5 and firmly hold the same in overlapping relation with the other end of the blank. Preferably resilient plate 13 is normally bent downwardly through a small angle along the line where the same emerges from sleeve 11, 12 (Fig. 2) and assumes a substantially horizontal position when it engages and clamps the end of blank 5 (Fig. 1).

The novel heat and pressure applying assembly mounted on sleeve 11 comprises an angular supporting member 15 which engages the upper and outer flat faces of sleeve 11 and is secured thereto by means of a plurality of cap screws 16 and 17 that threadedly engage counter-sunk openings in said sleeve. The free end of member 15 which is directly above plate 13 is provided with a downwardly projecting boss 18 in which an electric heating cartridge 19 is removably mounted. The electrical leads (not shown) for said cartridge may extend through hollow shaft 10 in order to prevent excessive twisting or bending of said leads during the angular oscillation of said shaft.

In the commercial production of containers for cigarettes, smoking tobacco and the like, high capacity machines must be employed and such machines utilize a plurality of mandrels or arbors in combination with a single welding or heating iron. The arbors are generally movably mounted, such as on a turret, and usually consist of hollow tubes having thin and more or less fragile walls. Accordingly, in practice it is substantially impossible to maintain the proper alignment between these fragile arbors and the present day sealing irons which alignment is necessary to assure the impervious joinder of the overlapping ends of blank 5. Furthermore, when the thickness of the blank varies, the necessary intimate contact between the material and the sealing iron at the thinner portions of the blank and the application of adequate pressure to said thinner portions cannot be obtained with sealing irons of the character that are obvious or now in use.

The present invention provides novel means adapted to automatically compensate for misalignment of the pressure applying surfaces and irregularities of the above nature. Said means in the illustrated embodiments comprise a plurality of aligned pressure applying elements 20 each of which is adapted to act upon a minor portion of the outer surface of seam 7, all of said elements acting independently, but collectively upon the surface of said seam throughout the length thereof. Elements 20 are mounted on the free end of supporting member 15 for limited vertical movement relative thereto, said elements having free sliding contact with said member and being adapted to absorb heat therefrom. Each of the elements 20 is provided with a groove or rabbet 21 into which a rib 22 on supporting member 15 extends, said rib having a somewhat smaller vertical dimension than said groove. In order to hold elements 20 in close sliding engagement with member 15 and with each other, a U-shaped bracket 23 is provided. Said bracket extends across the front of the group of elements 20 and is supported by stud bolts 24 which may be threadedly anchored in member 15, 22 and freely extend through enlarged openings in the adjacent elements 20. The ends of bracket 23 extend parallel to the exposed sides of the outermost elements 20 and have leaf springs 25 mounted thereon by means of bolts 26, said springs being adapted to engage said outermost elements and yieldingly hold all of the elements 20 in sliding engagement with one another (Fig. 3). It will be understood that the width of each of the elements 20, taken in the direction of the length of seam 7 may be of any suitable dimension.

In order that pressure may be applied to seam 7 by each of the elements 20 independently of the others, a multi-ply leaf spring A is provided for transmitting a yielding pressure to each of said elements. In the form shown, said springs comprise a metallic plate 27 secured to member 15 by stud bolts 17 and heat-insulated from said member by some suitable means such as mica discs 28. The free edge of plate 27 is divided into a plurality of fingers 29 each of which engages the upper edge of an element 20 and yieldingly presses it downwardly toward arbor 6. Additional plates 30 and 31, similar to but narrower than plate 27, may be mounted above the latter and held in position by stud bolts 17. A series of multi-ply leaf springs A are thus provided, each of said springs being effective to exert a yielding force on an element 20 said force being increased by clockwise rotation of shaft 10 after the operating faces of elements 20 engage seam 7.

As heretofore pointed out, a marginal portion 8 at one edge of blank 5 projects beyond the end of arbor 6. In order that pressure exerted by elements 20 on the overlapping ends of said projecting or overhanging portion may be effective, removable supporting means are provided therefore. As shown, said means comprise a reciprocable shoe or block 32 slidably mounted in a guide 33 and adapted to extend into the end of arbor 6. The upper surface of shoe 32 is preferably provided with a gap 34 which is bridged by a thin steel plate 35 of substantially the same thickness as the walls of arbor 6, the edge of said plate being adapted to butt against the end of said arbor when shoe 32 is in operative position (Fig. 3). Shoe 32, 35 is shown in withdrawn or inoperative position in Fig. 4. For a purpose to appear hereafter, a cooling medium 36 is preferably circulated in guide 35 to cool said supporting shoe.

In the operation of the above described apparatus, blank 5 is first wrapped around arbor 6 with the ends thereof in overlapping relation and held in this position by plate 9. Shoe 32, 35 is then moved into the position shown in Fig. 3 to support the overlapping ends of the projecting portion 8 and shaft 10 together with the heat and pressure applying assembly, is rotated in a counter-clockwise direction, as viewed in the drawing, from the position shown in Fig. 2. As shaft 10 turns, resilient plate 13 first engages the exposed end of blank 5. Continued rotation of the shaft brings the lower faces of elements 20 into contact with the overlapped portion of blank 5 between the edges of clamping plates 9 and 13. Slight additional movement of shaft 10 causes rib 22 to move away from the upper edges of grooves 21 and permits springs A to press elements 20 against seam 7. Heat flowing from member 15 into elements 20 and, thence, into seam 7 is effective to activate the thermoplastic adhesive coating disposed on one or both of the engaging surfaces of said seam, the activated adhesive being pressed into the interstices of said surfaces by the pressure exerted by springs A. It will be seen that each element 20 engages only a minor portion of the outer surface of seam 7 and that all of said elements collectively engage a continuous surface throughout the entire length of said seam. Because of the narrowness of each element 20 any detrimental effects resulting from the misalignment and irregularities heretofore discussed are substantially eliminated.

It has been found in practice that there should be a uni-directional flow of heat through the thermoplastic adhesive coating in seam 7 in order to properly activate said coating and that quick setting of the activated adhesive is necessary to insure an impervious seam. The thin steel wall of arbor 6 absorbs sufficient heat so that a uni-directional flow of heat from elements 20 is set up and said walls dissipate the heat absorbed thereby sufficiently fast to insure that said absorbed heat will not materially hinder the setting of the adhesive after elements 20 are withdrawn. Shoe 32, 35, on the other hand, being of heavier stock than arbor 6, absorbs and holds a great amount of heat, particularly since it functions with each of a plurality of arbors 6 in rather quick succession. Accordingly, unless cooling means are provided for shoe 32, 35, the heat absorbed thereby will materially impede the activation of the adhesive by preventing uni-directional heat flow and also the quick setting of the activated adhesive by supplying heat to the seam after withdrawal of the heating elements 20 and by causing an excessive amount of heat to be stored in the material of blank 5 which has relatively low heat conductivity and accordingly dissipates heat stored therein very slowly. The cooling water jacket in guide 33 is accordingly provided for absorbing heat from shoe 32, 35 after each sealing operation to thereby obviate the above difficulties.

After the heat and pressure applying elements 20 have been held in contact with seam 7 for a desirable short interval, shaft 10 is rotated in a clockwise direction. During this movement of the shaft, the upper edge of rib 22 first engages the upper surfaces of grooves 21 and simultaneously lifts all of the elements 20 out of engagement with the same. Continued movement of shaft 10 in a clockwise direction, is effective to lift plate 13 out of engagement with the edge of blank 5. It will thus be seen that any damage to seam 7 which might be caused by reason of blank 5 sticking to elements 20 when the latter are withdrawn, is prevented by clamping plates 9 and 13 which hold the overlapping ends of the blank in firm engagement with each other until after elements 20 have been lifted clear by member 15.

When the assembly which moves with shaft 10 has reached the position illustrated in Fig. 2, supporting shoe 32, 35 may be withdrawn to the position shown in Fig. 4. Arbor 6, with the tubular container body 5, 7 thereon, may then be moved to another station at which the projecting end 8 of the body may be folded in any suitable manner to form an end closure. In one machine which has been constructed, a group of cigarettes are then inserted through the left hand end of arbor 6 (Fig. 3) and the movement thereof through the arbor continued until body 5, 7 is slipped off the right hand end of the arbor. If desired, a flexible steel band 37 (Fig. 3) may extend across the operating faces of elements 20 and have the ends thereof secured in any suitable manner to the end portions of bracket 23. When the thin metal strap 37 is employed the adjacent corners of elements 20 may be chamfered, as shown in Fig. 3.

There is thus provided a novel method and means for adhesively heat sealing superposed layers of sheet material together, whereby application of adequate pressure to and proper heat flow through each part of the superposed layers being sealed is assured irrespective of any irregularities, such as variations in the thickness of the layers, or any misalignment of the operating faces of the pressure applying and pressure resisting elements. The novel means and method provided also obviate any harmful effects to the seam which might be caused during withdrawal of the heating irons. The novel apparatus of the invention is simple both in construction and operation, consumes only a small amount of space, and requires only a small amount of power in its operation.

Although only two embodiments of the invention have been illustrated and described in detail it is to be expressly understood that the same is not limited thereto. Various changes may be made, for example, in the design, arrangement and size of parts illustrated without departing from the spirit and scope of the invention, as will now be understood by those skilled in the art. For a definition of the limits of the invention, reference is had primarily to the appended claims.

What is claimed is:

1. In apparatus for heat sealing together superposed layers of sheet materials having a dry film of heat activatable adhesive interposed therebetween, supporting means for said superposed layers, means for holding said layers in superposed relation, a plurality of pressure elements, the operating faces of said elements being adapted to collectively engage a continuous surface on said superposed layers, common means for heating said elements, resilient means for individually pressing each of said elements against said surface, and common means for simultaneously moving said elements out of engagement with said surface.

2. In apparatus for applying pressure to a continuous surface, angularly movable supporting means, a plurality of pressure elements for collectively engaging said surface in its entirety, said elements being mounted on said supporting means for limited lineal movement relative thereto, and means including a separate leaf spring engaging each of said elements and carried by said supporting means for yieldingly pressing each of said elements against said surface.

3. In apparatus for applying pressure to a continuous surface, a plurality of rigid pressure elements for collectively engaging said surface, means for yieldably pressing each of said elements independently of one another against said surface, said means comprising a separate leaf spring engaging each of said elements, and common means for simultaneously moving said elements out of engagement with said surface.

4. In apparatus of the class described, angularly movable supporting means, a plurality of pressure elements, the operating faces of which are adapted to collectively engage a continuous surface, means for mounting said elements on said supporting means for limited linear movement relative thereto, and means including a separate leaf spring engaging each of said elements and mounted on said supporting means for pressing each of said elements independently of each other against said surface.

5. In apparatus of the class described, angularly movable supporting means, a plurality of pressure elements, the operating faces of which are adapted to collectively engage a continuous surface, means for mounting said elements on said supporting means for limited lineal movement relative thereto, means including a separate leaf spring engaging each of said elements and mounted on said supporting means for pressing each of said elements independently of each other against said surface, and means carried by said supporting means for heating said elements.

6. In apparatus for applying pressure to the overlapped ends of a blank wrapped about a form, movable supporting means, a resilient member mounted thereon for engaging the margin of the exposed overlapping end of said blank, a plurality of pressure elements adapted to collectively engage the outer surface of said overlapping ends, and means for mounting said elements on said supporting means for limited movement relative thereto, said resilient member and said elements being adapted to successively engage said overlapping ends in that order during movement of said supporting means in one direction.

7. In apparatus for applying pressure to the marginal portion adjacent the end of a blank wrapped around a form, movable supporting means, a resilient member carried by said supporting means and adapted to engage the edge of said blank to hold the same in position, and pressure means mounted on said supporting means for limited movement relative thereto and adapted to engage said marginal portion, said resilient member and pressure means being adapted to successively engage said blank in that order during movement of said supporting means in one direction and to successively disengage said blank in the reverse order during movement of said supporting means in the opposite direction.

8. In apparatus for heat-sealing together superposed layers of sheet materials having a dry film of thermoplastic adhesive interposed therebetween, resilient means for holding said layers in firm engagement with each other, means for applying heat and pressure to said superposed layers, and common means for successively moving said heat and pressure applying means and said resilient means out of engagement with said layers in that order during movement of said common means in one direction.

9. In apparatus for making a tubular container body from a blank having overlapping ends thereof adhesively sealed together, an arbor about which said blank is wrapped with a marginal portion thereof overhanging the end of the arbor, supporting means adapted to be moved into abutting relation with the wall of said arbor beneath the overlapping ends of said overhanging portion, and means for applying heat and pressure to the outer surfaces of said overlapping ends.

10. In apparatus for making a tubular container body from a blank having overlapping ends thereof adhesively sealed together, an arbor about which said blank is wrapped with a marginal portion thereof overhanging the end of the arbor, supporting means adapted to be moved into abutting relation with the wall of said arbor beneath the overlapping ends of said overhanging portion, a plurality of pressure members adapted to collectively engage the outer surface of said overlapping ends throughout the width of said blank, and means for pressing each of said elements individually of each other against said surface.

11. In the art of making containers, the method which includes applying a coating of thermoplastic adhesive to a blank of sheet material, drying said adhesive, wrapping said blank about a mandrel with the ends of said blank in overlapping relation, applying heat and pressure to said overlapping ends to activate said adhesive coating interposed therebetween, and applying pressure to the edge of the exposed overlapping end while withdrawing the heat and pressure applying means.

12. In the art of making containers, the method which includes wrapping a blank of sheet material about a mandrel with the ends thereof in overlapping relation, applying heat and pressure to the marginal portion of the exposed end of said blank to activate a dry film of thermoplastic adhesive previously disposed thereon, and applying pressure to the edge of said end while withdrawing the heat and pressure applying means.

13. The method which includes placing at least two layers of sheet material in superposed relation with a thin dry film of thermoplastic adhesive interposed therebetween, and separately applying heat and pressure to a plurality of restricted areas of said superposed layers simultaneously, said areas collectively constituting a continuous surface, and applying pressure to hold said superposed layers in position while withdrawing the heat and pressure applying means.

14. The method which includes placing at least two layers of sheet material in superposed relation with a thin dry coating of thermoplastic adhesive interposed therebetween, applying heat and pressure to said superposed layers to activate said thermoplastic adhesive, and mechanically holding said superposed layers in firm engagement with one another while withdrawing the heat and pressure applying means.

15. In apparatus for applying pressure to a continuous surface, a plurality of pressure elements for collectively engaging said surface, means including a separate leaf spring engaging each of said elements for pressing each of said elements independently of one another against said surface, and a plurality of rigid relatively movable supporting members for resisting the pressure exerted on said surface.

16. Apparatus for applying pressure to the longitudinal side seam of a tubular body comprising a plurality of rigid supporting members engaging the surface of said seam interiorly of said body, a plurality of pressure elements for collectively engaging the exterior surface of said seam, and means for pressing each of said elements independently of one another against said exterior surface.

17. In apparatus for applying pressure to a continuous surface, a continuous flexible member having one face thereof in engagement with said surface, a plurality of pressure elements for collectively engaging the opposite face of said member coextensively with said surface, and means for pressing each of said elements independently of one another against said member.

18. In apparatus for sealing superposed layers of sheet material together, resilient means for holding said layers in firm engagement with each other, means for applying pressure to said superposed layers, and common means for successively moving said pressure applying means and said resilient means out of engagement with said layers in that order during movement of said common means in one direction.

19. In apparatus for making a tubular body comprising a blank having overlapping ends thereof sealed together, an arbor about which said blank is wrapped with a marginal portion thereof overhanging the end of the arbor, supporting means adapted to be moved into abutting relation with the wall of said arbor adjacent the overlapping ends of said overhanging portion, and means for applying pressure to said overlapping ends.

GEORGE ARLINGTON MOORE.